US007011528B2

(12) United States Patent
Tweet et al.

(10) Patent No.: US 7,011,528 B2
(45) Date of Patent: Mar. 14, 2006

(54) METHOD AND SYSTEM FOR GENERATING A SKILL SHEET

(76) Inventors: Anne G. Tweet, P.O. Box 3515, Mammoth Lakes, CA (US) 93546; Craig F. Knoche, P.O. Box 3515, Mammoth Lakes, CA (US) 93546

( * ) Notice: Subject to any disclaimer, the term of this patent is extended or adjusted under 35 U.S.C. 154(b) by 578 days.

(21) Appl. No.: 10/357,787

(22) Filed: Feb. 3, 2003

(65) Prior Publication Data

US 2004/0153290 A1    Aug. 5, 2004

(51) Int. Cl.
*G09B 23/28* (2006.01)
*G09B 5/06* (2006.01)

(52) U.S. Cl. .................. 434/262; 434/219; 434/323; 434/365; 600/300; 705/11

(58) Field of Classification Search ............... 434/118, 434/219, 262, 272, 322, 323, 362, 365; 600/300; 128/845; 707/102; 706/15; 705/2, 3, 8, 705/9, 11, 28; 607/5; 703/17; 702/183; 345/8; 380/271; 235/492; 715/500, 505, 715/506

See application file for complete search history.

(56) References Cited

U.S. PATENT DOCUMENTS

| 4,360,345 A | * | 11/1982 | Hon ........................ 434/262 |
| 5,137,458 A | * | 8/1992 | Ungs et al. .................. 434/262 |
| 5,664,112 A | * | 9/1997 | Sturgeon et al. ............... 705/28 |
| 5,711,297 A | * | 1/1998 | Iliff ............................ 600/300 |
| 5,719,918 A | * | 2/1998 | Serbetciouglu et al. ...... 380/271 |
| 5,764,953 A | * | 6/1998 | Collins et al. ................. 703/17 |
| 5,799,282 A | * | 8/1998 | Rakshit et al. .................. 705/2 |
| 5,857,966 A | * | 1/1999 | Clawson ...................... 600/300 |
| 5,975,081 A | * | 11/1999 | Hood et al. .................. 128/845 |
| 5,989,187 A | * | 11/1999 | Clawson ...................... 600/300 |
| 6,004,266 A | * | 12/1999 | Clawson ...................... 600/300 |
| 6,010,451 A | * | 1/2000 | Clawson ...................... 600/300 |
| 6,022,315 A | * | 2/2000 | Iliff ............................ 600/300 |
| 6,053,864 A | * | 4/2000 | Clawson ...................... 600/300 |
| 6,076,065 A | * | 6/2000 | Clawson .......................... 705/2 |
| 6,078,894 A | * | 6/2000 | Clawson et al. .............. 705/11 |
| 6,089,459 A | * | 7/2000 | Eisele et al. ................. 235/492 |
| 6,106,459 A | * | 8/2000 | Clawson ...................... 600/300 |
| 6,341,287 B1 | * | 1/2002 | Sziklai et al. ................ 707/102 |
| 6,356,785 B1 | * | 3/2002 | Snyder et al. .................. 607/5 |
| 6,538,623 B1 | * | 3/2003 | Parnian et al. .................. 345/8 |
| 6,607,481 B1 | * | 8/2003 | Clawson ...................... 600/300 |
| 6,640,212 B1 | * | 10/2003 | Rosse ............................ 705/9 |
| 6,684,188 B1 | * | 1/2004 | Mitchell et al. ................. 705/3 |
| 6,687,685 B1 | * | 2/2004 | Sadeghi et al. ................ 706/15 |
| 6,739,877 B1 | * | 5/2004 | Bailey et al. ................. 434/262 |
| 6,863,536 B1 | * | 3/2005 | Fisher et al. ................. 434/272 |
| 2002/0069085 A1 | * | 6/2002 | Engel et al. .................... 705/2 |
| 2002/0076679 A1 | * | 6/2002 | Aman ......................... 434/262 |
| 2002/0103622 A1 | * | 8/2002 | Burge .......................... 702/183 |
| 2004/0014016 A1 | * | 1/2004 | Popeck et al. ............... 434/322 |
| 2004/0064342 A1 | * | 4/2004 | Browne et al. ................. 705/2 |
| 2004/0128178 A1 | * | 7/2004 | Barrer ............................ 705/8 |

* cited by examiner

*Primary Examiner*—Joe H. Cheng
(74) *Attorney, Agent, or Firm*—Elliot Furman

(57) ABSTRACT

A method and system generates skill sheets for a user participating in a medical emergency response simulation program. Providing a simulation scenario, a skill sheet template is chosen. The skill sheet template comprises a plurality of line items. The relevance of the line items are determined. Each relevant line item is evaluated and a score is computed. A skill sheet is generated from the evaluated line items of the skill sheet templates. The skill sheets generated are in compliance with Department of Transportation standards.

31 Claims, 19 Drawing Sheets

**National Registry of Emergency Medical Technicians
Advanced Level Practical Examination**

PATIENT ASSESSMENT - MEDICAL

Candidate: _____ Examiner: _____
Date: _____ Signature: _____
Scenario: _____
Time Start: _____

| | Possible Points | Points Awarded |
|---|---|---|
| Takes or verbalizes body substance isolation precautions | 1 | |
| SCENE SIZE-UP | | |
| Determines the scene/situation is safe | 1 | |
| Determines the mechanism of injury/nature of illness | 1 | |
| Determines the number of patients | 1 | |
| Requests additional help if necessary | 1 | |
| Considers stabilization of spine | 1 | |
| INITIAL ASSESSMENT | | |
| Verbalizes general impression of the patient | 1 | |
| Determines responsiveness/level of consciousness | 1 | |
| Determines chief complaint/apparent life-threats | 1 | |
| Assesses airway and breathing<br>-Assessment (1 point)<br>-Assures adequate ventilation (1 point)<br>-Initiates appropriate oxygen therapy (1 point) | 3 | |
| Assesses circulation<br>-Assesses/controls major bleeding (1 point)  -Assesses skin [either skin color, temperature, or condition] (1 point)<br>-Assesses pulse (1 point) | 3 | |
| Identifies priority patients/makes transport decision | 1 | |
| FOCUSED HISTORY AND PHYSICAL EXAMINATION/RAPID ASSESSMENT | | |
| History of present illness<br>-Onset (1 point)      -Severity (1 point)<br>-Provocation (1 point)  -Time (1 point)<br>-Quality (1 point)    -Clarifying questions of associated signs and symptoms as related to OPQRST (2 points)<br>-Radiation (1 point) | 8 | |
| Past medical history<br>-Allergies (1 point)      -Past pertinent history (1 point)      -Events leading to present illness (1 point)<br>-Medications (1 point)    -Last oral intake (1 point) | 5 | |
| Performs focused physical examination [assess affected body part/system or, if indicated, completes rapid assessment]<br>-Cardiovascular    -Neurological    -Integumentary    -Reproductive<br>-Pulmonary    -Musculoskeletal    -GI/GU    -Psychological/Social | 5 | |
| Vital signs<br>-Pulse (1 point)        -Respiratory rate and quality (1 point each)<br>-Blood pressure (1 point)    -AVPU (1 point) | 5 | |
| Diagnostics [must include application of ECG monitor for dyspnea and chest pain] | 2 | |
| States field impression of patient | 1 | |
| Verbalizes treatment plan for patient and calls for appropriate intervention(s) | 1 | |
| Transport decision re-evaluated | 1 | |
| ON-GOING ASSESSMENT | | |
| Repeats initial assessment | 1 | |
| Repeats vital signs | 1 | |
| Evaluates response to treatments | 1 | |
| Repeats focused assessment regarding patient complaint or injuries | 1 | |
| Time End: _____ | | |
| | TOTAL  48 | |

CRITICAL CRITERIA

_____ Failure to initiate or call for transport of the patient within 15 minute time limit
_____ Failure to take or verbalize body substance isolation precautions
_____ Failure to determine scene safety before approaching patient
_____ Failure to voice and ultimately provide appropriate oxygen therapy
_____ Failure to assess/provide adequate ventilation
_____ Failure to find or appropriately manage problems associated with airway, breathing, hemorrhage or shock [hypoperfusion]
_____ Failure to differentiate patient's need for immediate transportation versus continued assessment and treatment at the scene
_____ Does other detailed or focused history or physical examination before assessing and treating threats to airway, breathing, and circulation
_____ Failure to determine the patient's primary problem
_____ Orders a dangerous or inappropriate intervention
_____ Failure to provide for spinal protection when indicated

*You must factually document your rationale for checking any of the above critical items on the reverse side of this form.*

© 2000 National Registry of Emergency Medical Technicians, Inc., Columbus, OH
All materials subject to this copyright may be photocopied for the non-commercial purpose of educational or scientific advancement.    p302/B-003x

FIG. 1  PRIOR ART

| Condition for when to display this line Item | Indentation | Text Message | Points Possible | default points possible | Points Awarded | Comments |
|---|---|---|---|---|---|---|
| Always | 0 | {userName} {Call/timeOfPlay} {Call/dateOfPlay} | | | | |
| Always | 0 | Takes body substance isolation precautions | {medicalPossible[1]} | 1 | {medicalPoints[1]} | |
| Always | 0 | *SCENE SIZE UP* | | | | |
| medicalPoints[2]=1 | 0 | Determines scene safety | {medicalPossible[2]} | 1 | {medicalPoints[2]} | |
| medicalPoints[2]=0 | 0 | Determines scene safety | {medicalPossible[2]} | 1 | {medicalPoints[2]} | Pt. |
| medicalPoints[3]=1 | 0 | Determines the mechanism of injury/nature of illness | {medicalPossible[3]} | 1 | {medicalPoints[3]} | |
| medicalPoints[3]=0 | 0 | Determines the mechanism of injury/nature of illness | {medicalPossible[3]} | 1 | {medicalPoints[3]} | did not ask {mechanism/topicsMissed} |
| medicalPoints[4]≠99 | 0 | Determines the number of patients | {medicalPossible[4]} | 1 | {medicalPoints[4]} | |
| medicalPoints[4]=99 | 0 | Determines the number of patients | n/a | | n/a | Pt. unresponsive to questions |
| medicalPoints[5]=1 | 0 | Requests immediate ALS, if necessary | {medicalPossible[5]} | 1 | {medicalPoints[5]} | requested within {ALS/delayTimeString} minute(s) of arrival |
| medicalPoints[5]=0 | 0 | Requests immediate ALS, if necessary | {medicalPossible[5]} | 1 | {medicalPoints[5]} | {ALS/requiredTimeString} minutes of arrival |
| medicalPoints[5]=99 | 0 | Requests immediate ALS, if necessary | n/a | | n/a | immediate ALS not required for this call |
| medicalPoints[6]=1 | 0 | Performs initial spine stabilization, when appropriate | {medicalPossible[6]} | 1 | {medicalPoints[6]} | |
| medicalPoints[6]=0 | 0 | Performs initial spine stabilization, when appropriate | {medicalPossible[6]} | 1 | {medicalPoints[6]} | {traumaComments[6]} |
| medicalPoints[6]=99 | 0 | Performs initial spine stabilization, when appropriate | n/a | | n/a | call |
| Always | 0 | *INITIAL ASSESSMENT* | | | | |
| Always | 0 | Forms general impression of patient | {medicalPossible[7]} | 1 | {medicalPoints[7]} | |
| Always | 0 | Determines responsiveness/consciousness level | {medicalPossible[8]} | 1 | {medicalPoints[8]} | {traumaComments[8]} |
| medicalPoints[9]=1 | 0 | Determines chief complaint/apparent life threats | {medicalPossible[9]} | 1 | {medicalPoints[9]} | |
| medicalPoints[9]=0 | 0 | Determines chief complaint/apparent life threats | {medicalPossible[9]} | 1 | {medicalPoints[9]} | did not ask {complaints/topicsMissed} |
| medicalPoints[9]=99 | 0 | Determines chief complaint/apparent life threats | n/a | | n/a | Pt. unresponsive to questions |
| Always | 0 | Assesses Airway and Breathing | | | | |
| medicalPoints[10]=1 | 1 | Assessment | {medicalPossible[10]} | 1 | {medicalPoints[10]} | |
| medicalPoints[10]=0 | 1 | Assessment | {medicalPossible[10]} | 1 | {medicalPoints[10]} | within 2 minutes of arrival did not {traumaComments[10]} |
| Always | 1 | Assures adequate ventilation | {medicalPossible[12]} | 1 | {medicalPoints[12]} | {traumaComments[12]} |
| Always | 1 | Initiates appropriate oxygen therapy | {medicalPossible[11]} | 1 | {medicalPoints[11]} | {traumaComments[11]} |
| medicalPoints[13]=1 | 1 | Injury management | {medicalPossible[13]} | 1 | {medicalPoints[13]} | |
| medicalPoints[13]=0 | 1 | Injury management | {medicalPossible[13]} | 1 | {medicalPoints[13]} | {traumaComments[13]} |
| medicalPoints[13]=99 | 1 | Injury management | n/a | | n/a | call |
| Always | 0 | Assesses Circulation | | | | |
| medicalPoints[14]≠99 | 1 | Assesses & controls major bleeding | {medicalPossible[14]} | 1 | {medicalPoints[14]} | |

FIG. 4A

| 122 | 124 | 126 | 128 | 130 |
|---|---|---|---|---|
| medicalPoints[14]=99 | 1 Assesses & controls major bleeding | n/a | n/a | no life threatening external bleeding on this call |
| medicalPoints[15]=1 | 1 Assesses pulse | {medicalPossible[15]} | {medicalPoints[15]} | {traumaComments[15]} |
| medicalPoints[15]=0 | 1 Assesses pulse | {medicalPossible[15]} | {medicalPoints[15]} | did not check AND see rate within {CirculationAx/pulseDelayText} minute(s) of arrival. |
| medicalPoints[16]=1 | 1 Assesses skin (color, temperature, condition) | {medicalPossible[16]} | {medicalPoints[16]} | {traumaComments[16]} |
| medicalPoints[16]=0 | 1 Assesses skin (color, temperature, condition) | {medicalPossible[16]} | {medicalPoints[16]} | |
| medicalPoints[17]=1 | 0 Identifies Pt's priorities & makes appropriate transport decision | {medicalPossible[17]} | {medicalPoints[17]} | |
| medicalPoints[17]=0 | 0 Identifies Pt's priorities & makes appropriate transport decision | {medicalPossible[17]} | {medicalPoints[17]} | did not {traumaComments[17]} |
| Always | 0 | | | |
| | FOCUSED HISTORY & PHYSICAL EXAM/RAPID ASSESSMENT | | | |
| medicalPoints[18]<4 | 0 Signs and Symptoms (Assess history of present illness) | {medicalPossible[18]} | {medicalPoints[18]} | see errors below |
| medicalPoints[18]=4 | 0 Signs and Symptoms (Assess history of present illness) | {medicalPossible[18]} | {medicalPoints[18]} | |
| medicalPoints[18]=99 | 0 Signs and Symptoms (Assess history of present illness) | n/a | n/a | Pt. unresponsive to questions |
| DOTMedicalHx/AMS/Indicated=1 | 0 ALTERED MENTAL STATUS | | | |
| DOTMedicalHx/AMS/Indicated=1 | 1 Episode/Onset/Duration | | | {DOTMedicalHx/AMS/Comments[1]} |
| DOTMedicalHx/AMS/Indicated=1 | 1 Associated symptoms | | | {DOTMedicalHx/AMS/Comments[2]} |
| DOTMedicalHx/AMS/Indicated=1 | 1 Evidence of trauma? | | | {DOTMedicalHx/AMS/Comments[3]} |
| DOTMedicalHx/AMS/Indicated=1 | 1 Interventions? | | | {DOTMedicalHx/AMS/Comments[4]} |
| DOTMedicalHx/AMS/Indicated=1 | 1 Seizures? | | | {DOTMedicalHx/AMS/Comments[5]} |
| DOTMedicalHx/AMS/Indicated=1 | 1 Fever? | | | {DOTMedicalHx/AMS/Comments[6]} |
| DOTMedicalHx/Abdomen/Indicated=1 | 0 ABDOMINAL (not specified by DOT Skill Sheet) | | | |
| DOTMedicalHx/Abdomen/Indicated=1 | 1 Episode | | | {DOTMedicalHx/Abdomen/Comments[1]} |
| DOTMedicalHx/Abdomen/Indicated=1 | 1 Intake/Elimination | | | {DOTMedicalHx/Abdomen/Comments[2]} |
| DOTMedicalHx/Abdomen/Indicated=1 | 1 OPQRST | | | {DOTMedicalHx/Abdomen/Comments[3]} |
| DOTMedicalHx/Abdomen/Indicated=1 | 1 Associated symptoms & fever? | | | {DOTMedicalHx/Abdomen/Comments[4]} |
| DOTMedicalHx/Abdomen/Indicated=1 | 1 Interventions? | | | {DOTMedicalHx/Abdomen/Comments[5]} |
| DOTMedicalHx/Allergy/Indicated=1 | 0 ALLERGIC REACTION | | | |
| DOTMedicalHx/Allergy/Indicated=1 | 1 History of allergies? | | | {DOTMedicalHx/Allergy/Comments[1]} |
| DOTMedicalHx/Allergy/Indicated=1 | 1 What/How exposed? | | | {DOTMedicalHx/Allergy/Comments[2]} |
| DOTMedicalHx/Allergy/Indicated=1 | 1 Effects? | | | {DOTMedicalHx/Allergy/Comments[3]} |
| DOTMedicalHx/Allergy/Indicated=1 | 1 Progression? | | | {DOTMedicalHx/Allergy/Comments[4]} |
| DOTMedicalHx/Allergy/Indicated=1 | 1 Interventions? | | | {DOTMedicalHx/Allergy/Comments[5]} |
| Always | 0 | | | |

FIG. 4B

| 122 | | 124 | 126 | 128 | 130 |
|---|---|---|---|---|---|
| medicalPoints[19]=1 | 1 | Allergies | {medicalPossible[19]} | {medicalPoints[19]} | |
| medicalPoints[19]=0 | 1 | Allergies | {medicalPossible[19]} | {medicalPoints[19]} | did not ask {medicalComments[19]} |
| medicalPoints[19]=99 | 1 | Allergies | n/a | n/a | Pt. unresponsive to questions |
| medicalPoints[20]=1 | 1 | Medications | {medicalPossible[20]} | {medicalPoints[20]} | |
| medicalPoints[20]=0 | 1 | Medications | {medicalPossible[20]} | {medicalPoints[20]} | did not ask {medicalComments[20]} |
| medicalPoints[20]=99 | 1 | Medications | n/a | n/a | Pt. unresponsive to questions |
| medicalPoints[21]=1 | 1 | Past medical history | {medicalPossible[21]} | {medicalPoints[21]} | |
| medicalPoints[21]=0 | 1 | Past medical history | {medicalPossible[21]} | {medicalPoints[21]} | did not ask {medicalComments[21]} |
| medicalPoints[21]=99 | 1 | Past medical history | n/a | n/a | Pt. unresponsive to questions |
| medicalPoints[22]=1 | 1 | Last Meal | {medicalPossible[22]} | {medicalPoints[22]} | |
| medicalPoints[22]=0 | 1 | Last Meal | {medicalPossible[22]} | {medicalPoints[22]} | did not ask {medicalComments[22]} |
| medicalPoints[22]=99 | 1 | Last Meal | n/a | n/a | Pt. unresponsive to questions |
| medicalPoints[23]=1 | 1 | Events leading to present illness (rules out trauma) | {medicalPossible[23]} | {medicalPoints[23]} | |
| medicalPoints[23]=0 | 1 | Events leading to present illness (rules out trauma) | {medicalPossible[23]} | {medicalPoints[23]} | did not ask {medicalComments[23]} |
| medicalPoints[23]=99 | 1 | Events leading to present illness (rules out trauma) | n/a | n/a | Pt. unresponsive to questions |
| medicalPoints[24] | 0 | Problem focused physical examination | {medicalPossible[24]} | {medicalPoints[24]} | {medicalComments[24]} |
| Always | 0 | Obtains baseline vital signs | | | |
| Always | 1 | Breathing (rate & quality) | {medicalPossible[25]} | {medicalPoints[25]} | {medicalComments[25]} |
| Always | 1 | Pulse (rate & quality) | {medicalPossible[26]} | {medicalPoints[26]} | {medicalComments[26]} |
| Always | 1 | Skin (color, temperature, condition) | {medicalPossible[27]} | {medicalPoints[27]} | {medicalComments[27]} |
| Always | 1 | Blood pressure | {medicalPossible[28]} | {medicalPoints[28]} | {medicalComments[28]} |
| medicalPoints[29]≠99 | 0 | Obtains medical direction for medication interventions | {medicalPossible[29]} | {medicalPoints[29]} | |
| medicalPoints[29]=99 | 0 | Obtains medical direction for medication interventions | n/a | n/a | no interventions requiring medical direction for this call |
| medicalPoints[30]≠99 | 0 | Completes a detailed physical exam as appropriate | {medicalPossible[30]} | {medicalPoints[30]} | {medicalComments[30]} |
| medicalPoints[30]=99 | 0 | Completes a detailed physical exam as appropriate | n/a | n/a | detailed physical not required for this call |
| Always | 0 | | | | |
| *Always* | *0* | *ONGOING ASSESSMENT* | | | |
| Always | 0 | Repeats initial assessment | {medicalPossible[31]} | {medicalPoints[31]} | {medicalComments[31]} |
| Always | 0 | Repeats vital signs | {medicalPossible[32]} | {medicalPoints[32]} | {medicalComments[32]} |
| medicalPoints[33]=1 | 0 | Repeats focused assessment regarding Pt complaints or injuries | {medicalPossible[33]} | {medicalPoints[33]} | |
| medicalPoints[33]=0 | 0 | Repeats focused assessment regarding Pt complaints or injuries | {medicalPossible[33]} | {medicalPoints[33]} | after transport did not {medicalComments[33]} |
| medicalPoints[33]=99 | 0 | Repeats focused assessment regarding Pt complaints or injuries | n/a | n/a | Pt. unresponsive to questions |
| medicalPoints[34]≠99 | 0 | Checks patient condition following interventions | {medicalPossible[34]} | {medicalPoints[34]} | {medicalComments[34]} |
| medicalPoints[34]=99 | 0 | Checks patient condition following interventions | n/a | n/a | no interventions were performed |
| Always | 0 | | | | |
| Always | 0 | | | | |
| medicalCCFailure=0 | 0 | TOTAL | {medicalTotalPossible} | {medicalTotal} | {medicalPercentString} |

| | | 122 | | 124 | | 126 | 128 | 130 |
|---|---|---|---|---|---|---|---|---|
| | medicalCCFailure≠0 | | 0 | TOTAL | | {medicalTotalPossible} | {medicalTotal} | {medicalPercentString} FAILURE because of {medicalCCFailure} critical criteria error(s)! |
| | Always | | 0 | | | | | |
| | Always | | 0 | | | | | |
| | Always | | 0 | *CRITICAL CRITERIA* | | | | |
| | Always | | 0 | Fails if does not do the following: | | | | |
| | Always | | 0 | Takes body substance isolation precautions, if necessary | | | {medicalCritical[1]} | |
| | Always | | 0 | Determines scene safety | | | {medicalCritical[2]} | |
| | medicalCritical[3]=OK | | 0 | Provide high concentration of oxygen | | | {medicalCritical[3]} | |
| | medicalCritical[3]=X | | 0 | Provide high concentration of oxygen | | | {medicalCritical[3]} | {medicalCriticalComments[3]} |
| | Always | | 0 | Evaluates/finds conditions of airway, breathing, circulation | | | {medicalCritical[4]} | {medicalCriticalComments[4]} |
| | Always | | 0 | Manages problems with 'ABCs' or shock (hypoperfusion) | | | {medicalCritical[5]} | {medicalCriticalComments[5]} |
| | medicalCritical[6]=OK | | 0 | Differentiate Pts needing transport vs. assessment at the scene | | | {medicalCritical[6]} | {medicalCriticalComments[6]} |
| | medicalCritical[6]=X | | 0 | Differentiate Pts needing transport vs. assessment at the scene | | | {medicalCritical[6]} | did not {medicalCriticalComments[6]} |
| | Always | | 0 | Assesses/manages 'ABCs' before performing physical exam | | | {medicalCritical[7]} | {medicalCriticalComments[7]} |
| | Always | | 0 | Asks questions about the present illness | | | {medicalCritical[8]} | {medicalCriticalComments[8]} |
| | Always | | 0 | Administers a dangerous or inappropriate intervention | | | {medicalCritical[9]} | {medicalCriticalComments[9]} |
| | Always | | 0 | | | | | |
| | medicalCriticalComments[10] | | 0 | FYI (Not a Critical Criteria) | | | | |
| | medicalCriticalComments[10] | | 0 | Assess & provide for spinal protection | | | | {medicalCriticalComments[10]} |

FIG. 5A

| Condition for when to display this line item | Indentation | Text Message | Points Possible | default points possible | Points Awarded | Comments |
|---|---|---|---|---|---|---|
| Always | 0 | (userName) (Call/timeOfPlay) (Call/dateOfPlay) | | | | |
| Always | 0 | Takes body substance isolation precautions | {traumaPossible[1]} | 1 | {traumaPoints[1]} | |
| Always | 0 | *SCENE SIZE-UP* | | | | |
| {traumaPoints[2]}=1 | 0 | Determines scene safety | {traumaPossible[2]} | 1 | {traumaPoints[2]} | did not look around before approaching Pt. |
| {traumaPoints[2]}=0 | 0 | Determines scene safety | {traumaPossible[2]} | 1 | {traumaPoints[2]} | |
| {traumaPoints[3]}=1 | 0 | Determines the mechanism of injury | {traumaPossible[3]} | 1 | {traumaPoints[3]} | |
| {traumaPoints[3]}=0 | 0 | Determines the mechanism of injury | {traumaPossible[3]} | 1 | {traumaPoints[3]} | did not ask {mechanism/topicsMissed} |
| Always | 0 | Determines the number of patients | {traumaPossible[4]} | 1 | {traumaPoints[4]} | |
| {traumaPoints[5]}=1 | 0 | Requests immediate ALS, if necessary | {traumaPossible[5]} | 1 | {traumaPoints[5]} | requested within {ALS/delayTimeString} minute(s) of arrival |
| {traumaPoints[5]}=0 | 0 | Requests immediate ALS, if necessary | {traumaPossible[5]} | | {traumaPoints[5]} | did not request within {ALS/requiredTimeString} minutes of arrival |
| {traumaPoints[5]}=99 | 0 | Requests immediate ALS, if necessary | n/a | | n/a | immediate ALS not required for this call |
| {traumaPoints[6]}=1 | 0 | Performs initial spine stabilization, when appropriate | {traumaPossible[6]} | 1 | {traumaPoints[6]} | |
| {traumaPoints[6]}=0 | 0 | Performs initial spine stabilization, when appropriate | {traumaPossible[6]} | | {traumaPoints[6]} | {traumaComments[6]} |
| {traumaPoints[6]}=99 | 0 | Performs initial spine stabilization, when appropriate | n/a | | n/a | c-spine stabilization not required for this call |
| Always | 0 | *INITIAL ASSESSMENT* | | | | |
| Always | 0 | Forms general impression of patient | | | | |
| {traumaPoints[7]} | 0 | Determines and documents responsiveness/consciousness level | {traumaPossible[7]} | 1 | {traumaPoints[7]} | |
| {traumaPoints[8]}=1 | 0 | Determines chief complaint/apparent life threats | {traumaPossible[8]} | 1 | {traumaPoints[8]} | {traumaComments[8]} |
| {traumaPoints[9]}=1 | 0 | Determines chief complaint/apparent life threats | {traumaPossible[9]} | 1 | {traumaPoints[9]} | |
| {traumaPoints[9]}=0 | 0 | Determines chief complaint/apparent life threats | {traumaPossible[9]} | | {traumaPoints[9]} | did not ask {complaints/topicsMissed} |
| {traumaPoints[9]}=99 | 0 | Determines chief complaint/apparent life threats | n/a | | n/a | Pt. unresponsive to questions |
| Always | 0 | Assesses Airway and Breathing | | | | |
| {traumaPoints[10]}=1 | 1 | Assessment | {traumaPossible[10]} | 1 | {traumaPoints[10]} | |
| {traumaPoints[10]}=0 | 1 | Assessment | | | {traumaPoints[10]} | within 2 minutes of arrival did not {traumaComments[10]} |
| Always | 1 | Assures adequate ventilation | {traumaPossible[12]} | 1 | {traumaPoints[12]} | {traumaComments[12]} |
| Always | 1 | Initiates appropriate oxygen therapy | {traumaPossible[11]} | 1 | {traumaPoints[11]} | {traumaComments[11]} |
| {traumaPoints[13]}=1 | 1 | Injury management | {traumaPossible[13]} | 1 | {traumaPoints[13]} | |
| {traumaPoints[13]}=0 | 1 | Injury management | {traumaPossible[13]} | | {traumaPoints[13]} | {traumaComments[13]} |
| {traumaPoints[13]}=99 | 1 | Injury management | n/a | | n/a | injury management not needed for this call |
| Always | 1 | Assesses Circulation | | | | |
| {traumaPoints[14]}≠99 | 1 | Assesses & controls major bleeding | {traumaPossible[14]} | 1 | {traumaPoints[14]} | |
| {traumaPoints[14]}=99 | 1 | Assesses & controls major bleeding | n/a | | n/a | no life threatening external bleeding on this call |
| {traumaPoints[15]}=1 | 1 | Assesses pulse | {traumaPossible[15]} | 1 | {traumaPoints[15]} | {traumaComments[15]} |
| {traumaPoints[15]}=0 | 1 | Assesses pulse | {traumaPossible[15]} | | {traumaPoints[15]} | did not check AND see rate within {CirculationAx/pulseDelayText} minute(s) of arrival |
| {traumaPoints[16]}=1 | 1 | Assesses skin (color, temperature, condition) | {traumaPossible[16]} | 1 | {traumaPoints[16]} | |
| {traumaPoints[16]}=0 | 1 | Assesses skin (color, temperature, condition) | {traumaPossible[16]} | 1 | {traumaPoints[16]} | {traumaComments[16]} |

FIG. 5B

| | | | | | |
|---|---|---|---|---|---|
| traumaPoints[17]=1 | 0 | Identifies Pt's priorities & makes appropriate transport decision | {traumaPossible[17]} | 1 | {traumaPoints[17]} | |
| traumaPoints[17]=0 | 0 | Identifies Pt's priorities & makes appropriate transport decision | {traumaPossible[17]} | 1 | {traumaPoints[17]} | did not {traumaComments[17]} |
| Always | 0 | *FOCUSED HISTORY & PHYSICAL EXAM/RAPID ASSESSMENT* | | | | |
| Always | 0 | Selects & performs appropriate assessment (focused or rapid) | {traumaPossible[18]} | 1 | {traumaPoints[18]} | {traumaComments[18]} |
| Always | 0 | Obtains & Records baseline vital signs | | | | |
| Always | 1 | Breathing (rate & quality) | {traumaPossible[19]} | 1 | {traumaPoints[19]} | {traumaComments[19]} |
| Always | 1 | Pulse (rate & quality) | {traumaPossible[20]} | 1 | {traumaPoints[20]} | {traumaComments[20]} |
| Always | 1 | Blood Pressure | {traumaPossible[41]} | 1 | {traumaPoints[41]} | {traumaComments[41]} |
| Always | 1 | Skin (color, temperature, condition) | {traumaPossible[21]} | 1 | {traumaPoints[21]} | {traumaComments[21]} |
| traumaPoints[22]=6 | 0 | Obtains SAMPLE history (1 point each) | {traumaPossible[22]} | 6 | {traumaPoints[22]} | |
| traumaPoints[22]<6 | 0 | Obtains SAMPLE history (1 point each) | {traumaPossible[22]} | | {traumaPoints[22]} | did not ask {traumaComments[22]} |
| traumaPoints[22]=99 | 0 | Obtains SAMPLE history (1 point each) | n/a | | n/a | Pt unresponsive to questions |
| Always | 0 | *DETAILED PHYSICAL EXAMINATION* | | | | |
| Always | 0 | Assess the head: | | | | |
| Always | 1 | scalp and ears | {traumaPossible[23]} | 1 | {traumaPoints[23]} | {traumaComments[23]} |
| Always | 1 | eyes | {traumaPossible[24]} | 1 | {traumaPoints[24]} | {traumaComments[24]} |
| Always | 1 | facial, oral and nasal areas | {traumaPossible[25]} | 1 | {traumaPoints[25]} | {traumaComments[25]} |
| Always | 0 | Assess the neck: check for JVD and tracheal deviation | {traumaPossible[26]} | 1 | {traumaPoints[26]} | |
| Always | 0 | Assess the chest: | | | | |
| Always | 1 | inspect and palpate | {traumaPossible[27]} | 1 | {traumaPoints[27]} | {traumaComments[27]} |
| Always | 1 | auscultate | {traumaPossible[28]} | 1 | {traumaPoints[28]} | {traumaComments[28]} |
| Always | 0 | Assess the abdomen/pelvis | | | | |
| Always | 1 | abdomen | {traumaPossible[29]} | 1 | {traumaPoints[29]} | {traumaComments[29]} |
| Always | 1 | hips/pelvis | {traumaPossible[30]} | 1 | {traumaPoints[30]} | {traumaComments[30]} |
| Always | 1 | genitalia as needed | {traumaPossible[31]} | 1 | {traumaPoints[31]} | {traumaComments[31]} |
| Always | 0 | Assesses extremity (pulse, sensory & motor function) | | | | |
| Always | 1 | right arm & hand | {traumaPossible[32]} | 1 | {traumaPoints[32]} | {traumaComments[32]} |
| Always | 1 | left arm & hand | {traumaPossible[33]} | 1 | {traumaPoints[33]} | {traumaComments[33]} |
| Always | 1 | right leg & foot | {traumaPossible[34]} | 1 | {traumaPoints[34]} | {traumaComments[34]} |
| Always | 1 | left leg & foot | {traumaPossible[35]} | 1 | {traumaPoints[35]} | {traumaComments[35]} |
| Always | 0 | Assess the posterior: | | | | |
| Always | 1 | cervical spine | {traumaPossible[36]} | 1 | {traumaPoints[36]} | |
| Always | 1 | thoracic spine | {traumaPossible[37]} | 1 | {traumaPoints[37]} | |
| Always | 1 | lumbar spine | {traumaPossible[38]} | 1 | {traumaPoints[38]} | |
| Always | 0 | Manages secondary injuries & wounds appropriately | {traumaPossible[39]} | 1 | {traumaPoints[39]} | {traumaComments[39]} |
| Always | 0 | Repeats vital signs | {traumaPossible[40]} | 1 | {traumaPoints[40]} | {traumaComments[40]} |
| *traumaCCFailure=0* | 0 | *TOTAL* | {traumaTotalPossible} | | {traumaTotal} | {traumaPercentString} |
| traumaCCFailure≠0 | 0 | TOTAL | {traumaTotalPossible} | | {traumaTotal} | {traumaPercentString} FAILURE because of {traumaCCFailure} critical criteria error(s)! |
| Always | 0 | | | | | |
| *Always* | 0 | *CRITICAL CRITERIA* | | | | |
| Always | 0 | Fails if does not do the following: | | | {traumaCritical[1]} | |
| Always | 0 | Takes body substance isolation precautions, if necessary | | | | |

FIG. 5C

| | | | |
|---|---|---|---|
| Always | 0 | Determines scene safety | {traumaCritical[10]} |
| Always | 0 | Assess & provide for spinal protection | {traumaCritical[2]} | {traumaCriticalComments[2]} |
| traumaCritical[4]=OK | 0 | Provide high concentration of oxygen | {traumaCritical[4]} | |
| traumaCritical[4]=X | 0 | Provide high concentration of oxygen | {traumaCritical[4]} | {traumaCriticalComments[4]} |
| Always | 0 | Evaluates/finds conditions of airway, breathing, circulation | {traumaCritical[5]} | {traumaCriticalComments[5]} |
| Always | 0 | Manages problems with 'ABCs' or shock (hypoperfusion) | {traumaCritical[6]} | {traumaCriticalComments[6]} |
| traumaCritical[7]=OK | 0 | Differentiate Pts needing transport vs. assessment at the scene | {traumaCritical[7]} | {traumaCriticalComments[7]} |
| traumaCritical[7]=X | 0 | Differentiate Pts needing transport vs. assessment at the scene | {traumaCritical[7]} | did not {traumaCriticalComments[7]} |
| Always | 0 | Assesses/manages 'ABCs' before performing physical exam | {traumaCritical[8]} | {traumaCriticalComments[8]} |
| Always | 0 | Transports patient within ten (10) minutes | {traumaCritical[9]} | {traumaCriticalComments[9]} |

FIG. 6A

| Condition for when to display this line item | Text Message | Indentation | Points Possible | default points possible | Points Awarded | Comments |
|---|---|---|---|---|---|---|
| Always | {userName} {Call/timeOfPlay} {Call/dateOfPlay} | 0 | | | | |
| Always | Takes body substance isolation precautions | 0 | {cardiacPossible[1]} | 1 | {cardiacPoints[1]} | |
| Always | *SCENE SIZE-UP* | 0 | | | | |
| cardiacPoints[2]=1 | Determines scene safety | 0 | {cardiacPossible[2]} | 1 | {cardiacPoints[2]} | |
| cardiacPoints[2]=0 | Determines scene safety | 0 | {cardiacPossible[2]} | 1 | {cardiacPoints[2]} | did not look around before approaching Pt. |
| cardiacPoints[3]≠99 | Determines the number of patients | 0 | {cardiacPossible[3]} | 1 | {cardiacPoints[3]} | |
| cardiacPoints[3]=99 | Determines the number of patients | 0 | n/a | | n/a | Pt. unresponsive to questions |
| cardiacPoints[4]=1 | Briefly questions patient/rescuer about events | 0 | {cardiacPossible[4]} | 1 | {cardiacPoints[4]} | |
| cardiacPoints[4]=0 | Briefly questions patient/rescuer about events | 0 | {cardiacPossible[4]} | 1 | {cardiacPoints[4]} | did not ask {cardiacComments[4]} |
| cardiacPoints[4]=99 | Briefly questions patient/rescuer about events | 0 | n/a | | n/a | no witness present, and patient unable to respond |
| cardiacPoints[5]=1 | Performs initial spine stabilization, when appropriate | 0 | {cardiacPossible[5]} | 1 | {cardiacPoints[5]} | |
| cardiacPoints[5]=0 | Performs initial spine stabilization, when appropriate | 0 | {cardiacPossible[5]} | 1 | {cardiacPoints[5]} | {traumaComments[6]} |
| cardiacPoints[5]=99 | Performs initial spine stabilization, when appropriate | 0 | n/a | | n/a | c-spine stabilization not required for this call |
| Always | *ASSESSMENT* | 0 | | | | |
| cardiacPoints[6]≠99 | Directs rescuer to stop CPR | 0 | {cardiacPossible[6]} | 1 | {cardiacPoints[6]} | |
| cardiacPoints[6]=99 | Directs rescuer to stop CPR | 0 | n/a | | n/a | CPR not in progress on arrival |
| Always | Determines unresponsiveness | 0 | {cardiacPossible[7]} | 1 | {cardiacPoints[7]} | {cardiacComments[7]} |
| Always | Activates EMS | 0 | {cardiacPossible[8]} | 1 | {cardiacPoints[8]} | {cardiacComments[8]} |
| Always | Assesses Airway and Breathing | 0 | | | | |
| Always | Opens airway | 1 | {cardiacPossible[9]} | 1 | {cardiacPoints[9]} | {cardiacComments[9]} |
| Always | Determine breathlessness (look, listen, feel) | 1 | {cardiacPossible[11]} | 1 | {cardiacPoints[11]} | {cardiacComments[11]} |
| Always | Inserts simple airway adjunct (OPA/NPA) | 1 | {cardiacPossible[10]} | 1 | {cardiacPoints[10]} | {cardiacComments[10]} |
| cardiacPoints[12]=1 | Ventilate patient | 1 | {cardiacPossible[12]} | 1 | {cardiacPoints[12]} | {cardiacComments[12]} |
| cardiacPoints[12]=0 | Ventilate patient | 1 | {cardiacPossible[12]} | 1 | {cardiacPoints[12]} | |
| cardiacPoints[13]=1 | Assures high concentration of Oxygen | 1 | {cardiacPossible[13]} | 1 | {cardiacPoints[13]} | {cardiacComments[13]} |
| cardiacPoints[13]=0 | Assures high concentration of Oxygen | 1 | {cardiacPossible[13]} | 1 | {cardiacPoints[13]} | |
| Always | Assesses Circulation | 0 | | | | |
| Always | Verifies absence of spontaneous (carotid) pulse | 1 | {cardiacPossible[14]} | 1 | {cardiacPoints[14]} | {cardiacComments[14]} |
| Always | Delivers chest compression | 1 | {cardiacPossible[15]} | 1 | {cardiacPoints[15]} | {cardiacComments[15]} |
| Always | *AED SKILLS* | 0 | | | | |
| Always | Power on AED | 0 | {cardiacPossible[16]} | 1 | {cardiacPoints[16]} | {cardiacComments[16]} |
| Always | Attach AED electrodes to patient | 0 | {cardiacPossible[17]} | 1 | {cardiacPoints[17]} | {cardiacComments[17]} |
| Always | Stops CPR and directs rescuers to stand clear | 0 | {cardiacPossible[18]} | 1 | {cardiacPoints[18]} | {cardiacComments[18]} |
| Always | Initiates analysis of rhythm | 0 | {cardiacPossible[19]} | 1 | {cardiacPoints[19]} | {cardiacComments[19]} |
| cardiacPoints[20]=1 | Delivers shock (up to 3 successive shocks) | 0 | {cardiacPossible[20]} | 1 | {cardiacPoints[20]} | |

FIG. 6B

| | | {cardiacPossible[20]} | | {cardiacPoints[20]} | {cardiacComments[20]} |
|---|---|---|---|---|---|
| cardiacPoints[20]=0 | 0 | Delivers shock (up to 3 successive shocks) | | | |
| cardiacPoints[20]=99 | 0 | Delivers shock (up to 3 successive shocks) | n/a | n/a | no shock indicated by AED |
| cardiacPoints[21]≠99 | 0 | Verifies absence of spontaneous (carotid)pulse | {cardiacPossible[21]} | {cardiacPoints[21]} | {cardiacComments[21]} |
| cardiacPoints[21]=99 | 0 | Verifies absence of spontaneous (carotid)pulse | n/a | n/a | Pt. released before shock cycle complete |
| cardiacPoints[22]≠99 | 0 | Recheck breathing (look, listen, feel) | {cardiacPossible[22]} | {cardiacPoints[22]} | |
| cardiacPoints[22]=99 | 0 | Recheck breathing (look, listen, feel) | n/a | n/a | Pt. released before shock cycle complete |
| Always | 0 | TRANSITION | | | |
| | 0 | Directs resumption of CPR without prolonged Interruption | | | |
| cardiacPoints[23]<98 | | Directs resumption of CPR without prolonged interruption | {cardiacPossible[23]} | {cardiacPoints[23]} | {cardiacComments[23]} |
| cardiacPoints[23]=99 | 0 | Directs resumption of CPR without prolonged interruption | n/a | n/a | Pt. was revived |
| cardiacPoints[23]=98 | | | n/a | n/a | Pt. released before shock cycle complete |
| cardiacPoints[24]=0 | 0 | Gathers additional information on arrest event | {cardiacPossible[24]} | {cardiacPoints[24]} | did not ask (cardiac/topicsMissed) |
| cardiacPoints[24]=1 | 0 | Gathers additional information on arrest event | {cardiacPossible[24]} | {cardiacPoints[24]} | |
| cardiacPoints[24]=99 | 0 | Gathers additional information on arrest event | n/a | n/a | no witness present, and patient unable to respond |
| cardiacPoints[25]<98 | | Confirms effectiveness of CPR (ventilation & compression) | {cardiacPossible[25]} | {cardiacPoints[25]} | {cardiacComments[25]} |
| cardiacPoints[25]=98 | 0 | Confirms effectiveness of CPR (ventilation & compression) | n/a | n/a | Pt. released before shock cycle complete |
| cardiacPoints[25]=99 | 0 | Confirms effectiveness of CPR (ventilation & compression) | n/a | n/a | Pt. was revived |
| cardiacPoints[26]<98 | 0 | Repeats defibrillator sequence | {cardiacPossible[26]} | {cardiacPoints[26]} | {cardiacComments[26]} |
| cardiacPoints[26]=99 | 0 | Repeats defibrillator sequence | n/a | n/a | Pt. was revived |
| cardiacPoints[26]=98 | 0 | Repeats defibrillator sequence | n/a | n/a | Pt. released before 2nd sequence complete |
| Always | 0 | TRANSPORTATION | | | |
| cardiacPoints[27]≠99 | 0 | Transports patient | {cardiacPossible[27]} | {cardiacPoints[27]} | {cardiacComments[27]} |
| cardiacPoints[27]=99 | 0 | Transports patient | n/a | n/a | Pt. released to ALS on scene |
| Always | 0 | | | | |
| Always | 0 | | | | |
| cardiacCCFailure=0 | 0 | TOTAL | {cardiacTotalPossible} | {cardiacTotal} | {cardiacPercentString} |
| cardiacCCFailure≠0 | 0 | TOTAL | {cardiacTotalPossible} | {cardiacTotal} | {cardiacPercentString} FAILURE because of (cardiacCCFailure) critical criteria error(s)! |
| Always | 0 | | | | |
| Always | 0 | | | | |
| Always | 0 | CRITICAL CRITERIA | | | |
| Always | 0 | Fails if does not do the following: | | | |
| Always | 0 | Takes body substance isolation precautions, if necessary | | {cardiacCritical[1]} | |
| Always | 0 | Determines unresponsiveness | | {cardiacCritical[2]} | |

FIG. 6C

| | | | | |
|---|---|---|---|---|
| Always | 0 | Activates EMS | | [cardiacCritical[3]] | |
| Always | 0 | Opens airway, determines breathlessness | | [cardiacCritical[4]] | [cardiacCriticalComments[4]] |
| Always | 0 | Performs artificial ventilation | | [cardiacCritical[5]] | [cardiacCriticalComments[5]] |
| Always | 0 | Determines pulselessness | | [cardiacCritical[6]] | [cardiacCriticalComments[6]] |
| Always | 0 | Delivers chest compressions | | [cardiacCritical[7]] | |
| Always | 0 | Power on AED | | [cardiacCritical[8]] | [cardiacCriticalComments[8]] |
| Always | 0 | Attach AED electrodes in proper location | | [cardiacCritical[9]] | [cardiacCriticalComments[9]] |
| Always | 0 | Assures stand clear before delivering shocks | | [cardiacCritical[10]] | [cardiacCriticalComments[10]] |
| Always | 0 | Operates AED Properly | | [cardiacCritical[11]] | [cardiacCriticalComments[11]] |
| cardiacCritical[12]≠NA | 0 | Re-check breathing & pulse after 'no shock' | | [cardiacCritical[12]] | [cardiacCriticalComments[12]] |
| cardiacCritical[12]=NA | 0 | Re-check breathing & pulse after 'no shock' | OK | | Pt. released before shock cycle complete |
| cardiacCritical[13]≠NA | 0 | Administer shock within 90 secs of AED 'arrival' | | [cardiacCritical[13]] | [cardiacCriticalComments[13]] |
| cardiacCritical[13]=NA | 0 | Administer shock within 90 secs of AED 'arrival' | OK | | No shock was advised. |
| Always | 1 and 3 minutes of arrest | | | | |
| cardiacDRTComment=extra | 0 | | | | |
| cardiacDRTComment=extra | 0 | *Sometimes patients will die despite your very best efforts. This patient died due to circumstances out of your control.* | | | |
| Always | 0 | | | | |
| Always | 0 | | | | |
| Always | 0 | YOUR ACTIONS | | | |
| Cardiac/orderError=0 | 0 | your KEY graded actions were in order | Order | done: | Recommended Order: |
| Cardiac/orderError=1 | 0 | ** KEY graded actions were OUT of order | Order | done: | Recommended Order: |
| Always | 1 | | | [cardiacComments[30]] | Pt. was in cardiac arrest |
| Always | 1 | | | [cardiacComments[31]] | question |
| Always | 1 | | | [cardiacComments[32]] | use pain stimulus to check responsiveness |
| Always | 1 | | | [cardiacComments[33]] | activate EMS/call ALS |
| Always | 1 | | | [cardiacComments[34]] | thrust |
| Always | 1 | | | [cardiacComments[35]] | check airway (nose,mouth,chest) |
| Always | 1 | | | [cardiacComments[36]] | insert OPA/NPA |
| Always | 1 | | | [cardiacComments[37]] | ventilate Pt. with bvm |
| Always | 1 | | | [cardiacComments[38]] | check for carotid pulse |
| Always | 1 | | | [cardiacComments[39]] | start compressions |
| Always | 1 | | | [cardiacComments[40]] | turn AED on |
| Always | 1 | | | [cardiacComments[41]] | apply electrode pads |
| Always | 1 | | | [cardiacComments[42]] | asked all to stand clear |
| Always | 1 | | | [cardiacComments[43]] | delivered first shock |
| Always | 1 | | | [cardiacComments[44]] | AED end analysis/shock cycle |

MERS Assessment

<u>Victor Hurt - Call 16</u>

Name: Anne Tweet Oct 4 2002 3:27 PM

3:25 PM Oct 4 2002

Trauma Assessment & Management

Possible Awarded

Name: Anne Tweet Oct 4 2002 3:27 PM
Trauma evaluation not relevant in this case

Medical Assessment & Management

|  | Possible | Awarded |  |
|---|---|---|---|
| Name: Anne Tweet Oct 4 2002 3:27 PM |  |  |  |
| Takes body substance isolation precautions | 1 | 1 |  |
| SCENE SIZE-UP |  |  |  |
| Determines scene safety | 1 | 1 |  |
| Determines the mechanism of injury/nature of illness | 1 | 0 | did not ask what happened |
| Determines the number of patients | 1 | 0 |  |
| Requests immediate ALS, if necessary | n/a | n/a | immediate ALS not required for this call |
| Performs initial spine stabilization, when appropriate | n/a | n/a | c-spine stabilization not required for this call |
| INITIAL ASSESSMENT |  |  |  |
| Forms general impression of patient | 1 | 1 |  |
| Determines & documents responsiveness/consciousness level | 1 | 0 | did not document AVPU in first vitals set |
| Determines chief complaint/apparent life threats | 1 | 1 |  |
| Assesses Airway and Breathing |  |  |  |
| . . Assessment | 1 | 1 |  |
| . . Assures adequate ventilation | 1 | 1 |  |
| . . Initiates appropriate oxygen therapy | 1 | 0 | failed to administer oxygen |
| . . Injury management | n/a | n/a | airway injury management not needed for this call |
| Assesses Circulation |  |  |  |
| . . Assesses & controls major bleeding | n/a | n/a | no life threatening external bleeding on this call |
| . . Assesses pulse | 1 | 1 | Pt. conscious and speaking on arrival. |
| . . Assesses skin (color, temperature, condition) | 1 | 0 | did not palpate bare skin to check temperature and moisture within 3 |

FIG. 7A

| | | | |
|---|---|---|---|
| | | | minute(s) of arrival; did not document skin appearance in first vitals set |
| Identifies Pt's priorities & makes appropriate transport decision | 1 | 0 | did not transport; correctly document patient's top priority problem |
| FOCUSED HISTORY & PHYSICAL EXAM/RAPID ASSESSMENT | | | |
| Signs and Symptoms (Assess history of present illness) | 4 | 1 | see errors below |
| ALTERED MENTAL STATUS | | | |
| . . Episode/Onset/Duration | | | did not ask patient activities at onset, previous occurrence of symptoms, what led to the symptoms |
| . . Associated symptoms | | | did not ask blacking out, vision problems, coordination and balance, problems thinking |
| . . Evidence of trauma? | | | did not examine the forehead, check both pupils; ask head pain |
| . . Interventions? | | | did not ask medications |
| . . Seizures? | | | OK |
| . . Fever? | | | did not palpate the forehead |
| . . Allergies | 1 | 0 | did not ask allergies |
| . . Medications | 1 | 0 | did not ask medications, alcohol, recreational drugs, when medications were taken, quantity of medications taken |
| . . Past medical history | 1 | 0 | did not ask hospitalization for medical condition |
| . . Last Meal | 1 | 0 | did not ask most recent meal, amount eaten |
| . . Events leading to present illness (rules out trauma) | 1 | 0 | did not ask what led to the symptoms, patient activities at onset |
| Problem focused physical examination | 1 | 0 | Focused assessment of head appropriate. Did not examine the forehead, check |

FIG. 7B

| | | | both pupils |
|---|---|---|---|
| Obtains baseline vital signs | | | |
| . . Breathing (rate & quality) | 1 | 0 | did not document respiration rate AND quality in first vitals set within 5 minutes of arrival |
| . . Pulse (rate & quality) | 1 | 1 | |
| . . Skin (color, temperature, condition) | 1 | 0 | did not document skin color, temperature & condition in first vitals set within 5 minutes of arrival |
| . . Blood pressure | 1 | 0 | did not document blood pressure in first vitals set within 5 minutes of arrival |
| Obtains medical direction for medication interventions | n/a | n/a | no patient prescribed Rx administered on this call |
| Completes a detailed physical exam as appropriate | n/a | n/a | detailed physical not required for this call |
| ONGOING ASSESSMENT | | | |
| Repeats initial assessment | 1 | 0 | |
| Repeats vital signs | 1 | 0 | at least 2 sets of vitals not taken and documented |
| Repeats focused assessment regarding Pt complaints/injuries | 1 | 0 | after transport did not ask how patient is feeling, head pain |
| Checks patient condition following interventions | n/a | n/a | no interventions were performed |
| TOTAL | 30 | 9 | 30% FAILURE because of 5 critical criteria error(s)! |
| CRITICAL CRITERIA | | | |
| Fails if does not do the following: | | | |
| Takes body substance isolation precautions, if necessary | | OK | |
| Determines scene safety | | OK | |
| Provide high concentration of oxygen | | X | |
| Evaluates/finds conditions of airway, breathing, circulation | | X | errors in initial assessment of circulation |
| Manages problems with 'ABCs' or shock (hypoperfusion) | | OK | |
| Differentiate Pts needing transport vs. assessment at the scene | | X | did not transport |
| Assesses/manages 'ABCs' before performing physical exam | | X | before completing ABCs, began assessment questions - asked current time, current location, |

FIG. 7C

|  |  |  |
|---|---|---|
| Asks questions about the present illness | X | why patient is here, medical problems, history of seizures completed less than half the exams/questions for assessing Signs & Symptoms |
| Administers a dangerous or inappropriate intervention | OK | |

Cardiac Arrest Management / AED

Possible Awarded

Name: Anne Tweet Oct 4 2002 3:27 PM
Cardiac evaluation not relevant in this case

☒ MERS | Assessment | Assessment Process | Treatment | Documentation | Skill Sheets | Trauma | Medical | Cardiac | Save 3:25 PM Oct 4 2002

| | Points – Possible Awarded | | Comments |
|---|---|---|---|
| Takes body substance isolation precautions | 1 | 1 | |
| SCENE SIZE-UP | | | |
| Determines scene safety | 1 | 1 | |
| Determines the mechanism of injury/nature of illness | 1 | 0 | did not ask what happened |
| Determines the number of patients | 1 | 0 | |
| Requests immediate ALS, if necessary | n/a | n/a | immediate ALS not required for this call |
| Performs initial spine stabilization, when appropriate | n/a | n/a | c-spine stabilization not required for this call |
| INITIAL ASSESSMENT | | | |
| Forms general impression of patient | 1 | 1 | |
| Determines & documents responsiveness/consciousness level | 1 | 0 | did not document AVPU in first vitals set |
| Determines chief complaint/apparent life threats | 1 | 1 | |
| Assesses Airway and Breathing | | | |
|   Assessment | 1 | 1 | |
|   Assures adequate ventilation | 1 | 1 | |
|   Initiates appropriate oxygen therapy | 1 | 0 | failed to administer oxygen |
|   Injury management | n/a | n/a | airway injury management not needed for this call |
| Assesses Circulation | | | |
|   Assesses & controls major bleeding | n/a | n/a | no life threatening external bleeding on this call |
|   Assesses pulse | 1 | 1 | Pt. conscious and speaking on arrival. |
|   Assesses skin (color, temperature, condition) | 1 | 0 | did not palpate bare skin to check temperature and moisture within 3 minute(s) of arrival; did not document skin appearance in first vitals set |
| Identifies Pt's priorities & makes appropriate transport decision | 1 | 0 | did not transport; correctly document patient's top priority problem |
| FOCUSED HISTORY & PHYSICAL EXAM/RAPID ASSESSMENT | | | |
| Signs and Symptoms (Assess history of present illness) | 4 | 1 | see errors below |
| ALTERED MENTAL STATUS | | | |
| Episode/Onset/Duration | | | did not ask patient activities at onset, previous occurrence of symptoms, what led to the symptoms |

Medical Assessment & Management – Page 1 next page ▶

FIG. 8C

| MERS | Assessment | Assessment Process | Treatment | Documentation | Skill Sheets | Trauma | Medical | Cardiac | Save |

| | Points Possible | Awarded | Comments |
|---|---|---|---|
| Checks patient condition following interventions | n/a | n/a | no interventions were performed |
| TOTAL | 30 | 9 | 30% FAILURE because of 5 critical criteria error(s)! |

CRITICAL CRITERIA

| | | |
|---|---|---|
| Fails if does not do the following: | | |
| Takes body substance isolation precautions, if necessary | OK | |
| Determines scene safety | OK | |
| Provide high concentration of oxygen | X | |
| Evaluates/finds conditions of airway, breathing, circulation | X | errors in initial assessment of circulation |
| Manages problems with 'ABCs' or shock (hypoperfusion) | OK | |
| Differentiate Pts needing transport vs. assessment at the scene | X | did not transport |
| Assesses/manages 'ABCs' before performing physical exam | X | before completing ABCs, began assessment questions - asked current time, current location, why patient is here, medical problems, history of seizures |
| Asks questions about the present illness | X | completed less than half the exams/questions for assessing Signs & Symptoms |
| Administers a dangerous or inappropriate intervention | OK | |

*previous page*  Medical Assessment & Management - Page 3

METHOD AND SYSTEM FOR GENERATING A SKILL SHEET

BACKGROUND

Emergency medical services (EMS) personnel must obtain and maintain various certifications in order to work in their profession and treat patients. To become certified or maintain certification, EMS personnel must take and pass standardized written and practical tests. The standards adhered to by these tests are specified by organizations such as the U.S. Department of Transportation (DOT) and the National Registry of Emergency Medical Technicians (NREMT).

The tests include an evaluation of a candidate's skill in conducting patient assessment and making appropriate treatment decision using standardized protocols for medical, trauma, and cardiac patient problems. The evaluations are conducted by an instructor using a set of standardized skill sheets that specify the protocol order and points possible for each action or decision on the skill sheet.

FIG. 1 shows an exemplary prior art medical skill sheet used by an instructor. As shown, the skill sheet is very comprehensive and comprises line items for areas such as "SCENE SIZE-UP" 10, "INITIAL ASSESSMENT" 20, "FOCUSED HISTORY AND PHYSICAL EXAMINATION/RAPID ASSESSMENT" 30, "ON-GOING ASSESSMENT" 40, and "CRITICAL CRITERIA" 42. All line items, such as line item 70, "Determines responsiveness/level of consciousness" have a "Possible Points" 50 and a "Points Awarded" 60 for scoring the candidate.

During a test, the instructor presents the candidate with a scenario. The scenario is described by the instructor, and also may include actors acting out the scenario. The candidate must articulate their decision and actions, sometimes physically demonstrating various actions. For example, depending on the scenario, a candidate may need to open a patient's airway with a head-tilt-chin-lift motion. As the candidate describes and performs the actions, the instructor uses the appropriate skill sheet to check-off and score the student on each line item.

The skill sheets are one of the most difficult items for a candidate to master since they integrate many aspects of classroom and book learning. The best way for a candidate to prepare for a skill sheet test and improve their proficiency is though practice and repetition. Unfortunately, it is often difficult to arrange for practice tests since a qualified and objective instructor is required to conduct the drill and allow the candidate to repeat the drill a multiple number of times. Additionally, actors may be necessary, further complicating the situation. Furthermore, while the instructors should ideally be objective and follow the protocols precisely, oftentimes they are not or cannot be due to fatigue, level of experience, personal feeling towards the candidate, and the like.

Thus a need presently exists for a method and system for generating a skill sheet in a consistent and objective manner, and without the limitations of the prior art.

SUMMARY

By way of introduction, the preferred embodiments below provide a method and system for generating a skill sheet. Skill sheets are generated for a user participating in a simulation program such as a medical emergency response simulation program. The simulation program comprises a human model for simulating the response of a simulated human subject to the input of the user. Providing a simulation scenario, a template is chosen. The template comprises a plurality of line items. The relevance of the line items is determined. The relevance may be determined at the outset of the simulation scenario and dynamically during the simulation according to user input. The relevant line items are evaluated which includes computing a score for the relevant line items. A skill sheet is generated comprising the scored line items of the skill sheet template. The skill sheets are generated in a format consistent with a standard such as a Department of Transportation standard or a National Registry of Emergency Medical Technicians standard. A system comprises a simulator comprising a human model. An event logger is in communication with the simulator. An evaluator is in communication with the simulator and with the event logger. At least one skill sheet template is in communication with the evaluator. A skill sheet generator is in communication with the evaluator. The simulator and the event logger receives user input.

The foregoing paragraph has been provided by way of general introduction, and it should not be used to narrow the scope of the following claims. The preferred embodiments will now be described with reference to the attached drawings.

BRIEF DESCRIPTION OF THE DRAWINGS

FIG. 1 is a prior art medical skill sheet.
FIGS. 4A–D is a medical skill sheet template.
FIGS. 5A–C is a trauma skill sheet template.
FIGS. 6A–C is a cardiac skill sheet template.
FIGS. 7A–D is a skill sheet resulting from a simulation.
FIGS. 8A–C is a medical skill sheet resulting from a simulation.

DETAILED DESCRIPTION OF THE PRESENTLY PREFERRED EMBODIMENTS

Figure 2:
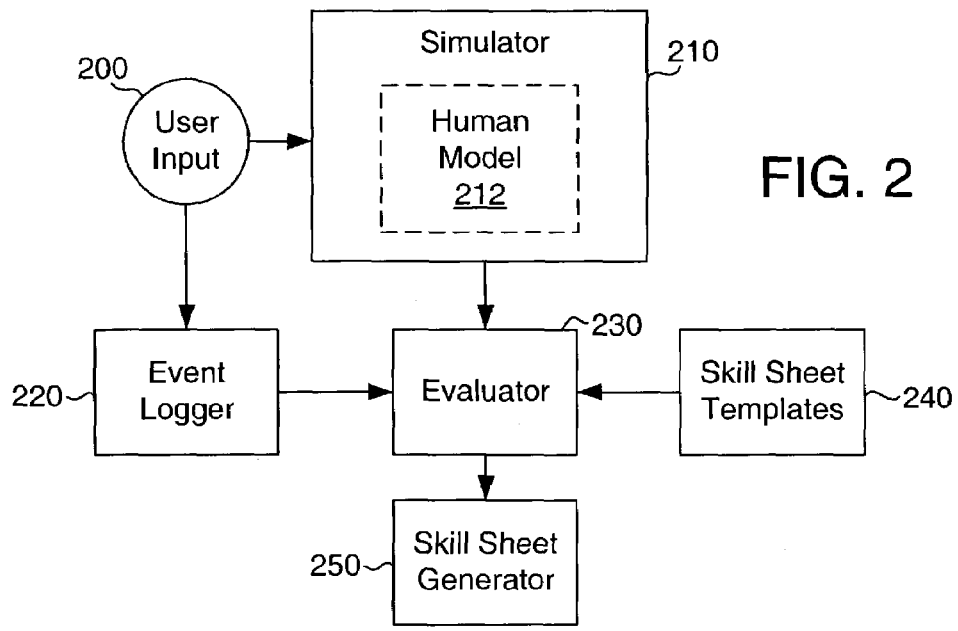
FIG. 2 is a system for generating a skill sheet.

FIG. 2 shows a system for generating a skill sheet. The present invention generates a skill sheet for a user, such as an EMS candidate, participating in a medical emergency response simulation program. The system comprises a simulator 210 that receives as input user input 200. The simulation program comprises a human model 212 for simulating the response of a simulated human subject, or patient, according to the input of the user 200. The simulation program allows the user to gather relevant information about a patient's signs, symptoms, prior history, and perform various treatments and appropriate EMS communications. One example of a simulation program is Brady's Medical Emergency Response Simulator by Summit Performance Group, LLC, and published by Prentice Hall.

The system further comprises an event logger 220 that receives as input the user input 200 and the output of the simulator 210. The output of the simulator comprises variables indicating the status of the patient 212 and the type of user input 200. Some examples of user input are variables indicating at what time the user arrived on the scene, when the user started to transport the patient, when the user called advanced life support, when the user examined a particular body part, when the user asked witnesses questions, and the like. Some examples of simulator output are errors such as the inappropriate use of pain stimulus, completed actions such as if the user asked the patient a question and whether the patient was able to respond, and progression events such as whether the patient is in cardiac arrest, has a spinal cord injury, has respiratory distress, and the like.

The event logger 220 stores user input 200 and the simulator output 210. An evaluator 230 receives as input the output of the event logger 220 and the output of the simulator 210. The evaluator also receives as input skill sheet templates 240. The evaluator 230 and skill sheet templates 240 will be described in greater detail below. A skill sheet generator 250 receives the output of evaluator 230. The generator 250 produces a scored skill sheet in an acceptable format for display to the user.

Briefly, simulator 210 simulates a patient according to one of a multiplicity of simulation scenarios, and further simulates the response of the patient to the actions of the user 200. The user 200 interacts with the patient to determine the patient's problem or problems. The user 200 may also administer various forms of medical treatment to the patient. The user actions 200 as well as the output of simulator 210 are logged by the event logger. The appropriate skill sheet templates 240 are chosen according to the simulation scenario and the user input. An evaluator scores the skill sheet templates by examining the output of the simulator and the output of the event logger 220. The evaluator evaluates according to appropriate standards, such as the DOT standards, and in compliance with industry standard skill sheets and skill sheet scoring protocols. The skill sheet generator 250 generates a skill sheet or skill sheets comprising the scores evaluated by the evaluator 230 along with any comments or other appropriate text.

Figure 3:
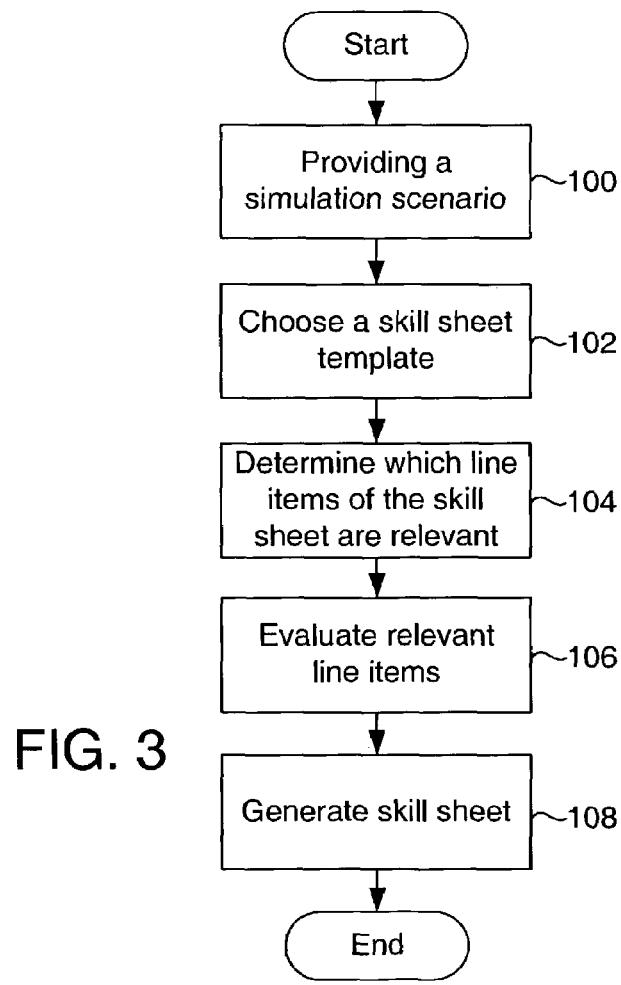
FIG. 3 is a method for generating a skill sheet.

FIG. 3 shows a method for generating a skill sheet. The simulation program 210 provides a multiplicity of simulation scenarios for allowing the user to practice emergency medicine on the human model or patient 212. Some examples of simulation scenarios are the patient has chest pains and goes into cardiac arrest, the patient has hypoglycemia, the patient has a stroke, the patient has a broken wrist, the patient has internal bleeding, the patient has external life threatening bleeding, and the like. It is appreciated by those of ordinary skill in the art that many more simulation scenarios are possible.

Referring to FIG. 3, and providing one of the multiplicity of simulation scenarios (step 100), a skill sheet template is chosen (step 102). Depending on the simulation scenario more than one skill sheet template may be chosen. It is also possible that, as the simulation executes and the user interacts with the patient, an additional skill sheet template that was not chosen at the outset of the simulation is chosen during the simulation.

A medical skill sheet template is shown in FIGS. 4A–D. The skill sheet template comprises a plurality of line items. The line items represent actions that the user may take during the simulation. The line items are grouped by categories such as "SCENE SIZE-UP" 110 (FIG. 4A), "INITIAL ASSESSMENT" 112 (FIG. 4A), "FOCUSED HISTORY AND PHYSICAL EXAM/RAPID ASSESSMENT" 114 (FIG. 4B), "ONGOING ASSESSMENT" 116 (FIG. 4C), and "CRITICAL CRITERIA" 118 (FIG. 4D). Each line item comprises a condition variable 122, a points possible variable 126, and a points awarded variable 128. Each line item may also comprise a text message 124, and a comment 130. Examining line item 120 of FIG. 4B, the condition variable 122 is medicalPoints[18], the text message 124 is "Signs and Symptoms (Assess history of present illness)," the points possible variable 126 is medicalPossible[18], and the points awarded variable 128 is medicalPoints[18]. As shown, the condition variables 122, points possible variables 126, and points awarded variables 130 are members of arrays. Additional skill sheet templates are shown in FIGS. 5A–C and 6A–C. FIGS. 5A–C is a trauma skill sheet template. FIGS. 6A–C is a cardiac skill sheet template. FIGS. 5A–C and 6A–C follow the same format as the medical skill sheet template of FIGS. 4A–D, but comprise different line items. The templates of FIGS. 4A–D, 5A–C, and 6A–C comprise line items consistent with DOT standard skill sheets. Other skill sheet templates comprising line items consistent with other standard skill sheets such as AHA standard skill sheets and NREMT standard skill sheets may be used.

Each simulation scenario (step 100) comprises a set of skill sheet variables for choosing a skill sheet template (step 102 and 240 of FIG. 2). For example, if the simulation scenario simulates a patient with a broken wrist, the skill sheet variables indicate that medical_skill_sheet=false, trauma_skill_sheet=true, and cardiac_skill_sheet=false, that is the medical and cardiac skill sheet templates are not chosen, and the trauma skill sheet template is chosen. For more complicated simulation scenarios, the skill sheet variables may change dynamically during the execution of the simulation scenario. For example, in a different simulation, the patient may not develop a cardiac problem until well into the simulation. The cardiac problem may be induced by a bad choice taken by the user. In one simulation the patient does not go into cardiac arrest until two minutes into the simulation. At that time, the cardiac_skill_sheet variable may change from false to true.

Upon choosing a skill sheet template (step 102), the relevance of each line item of the plurality of line items is determined (step 104). Some line items will always be relevant regardless of the simulation scenario. For example line item 134 of the medical skill sheet template of FIG. 4A, "Forms general impression of patient," is always relevant according to DOT standards. Other line items will be relevant depending upon the simulation scenario, or depending upon user input.

Each simulation scenario maintains relevance variables for indicating which line items are relevant so at the outset of the simulation, those line items are determined in compliance with the prevailing standards. For example, if the simulation scenario comprises an unconscious patient, line items comprising taking c-spine precautions are always relevant according to DOT standards. Also, if a child in the simulation scenario has fallen a distance of greater than ten feet, or the simulation comprises a motor vehicle accident, the line items comprising taking c-spine precautions are indicated as relevant according to DOT standards.

Some line items, while not determined as relevant by the relevance variables, can become relevant as the simulation progresses, or due to user input. For example, if the user takes c-spine precautions on the patient when no c-spine precaution is indicated or necessary, the line items associated with c-spine precautions are determined as relevant, and the user will be evaluated on those line items as described below in accordance with the prevailing standards.

Referring back to FIG. 3, the relevant line items are evaluated (step 106) according to user input to the simulation scenario as logged by the event logger 220 and indicated by the output of the simulator 210. Proper and appropriate user actions for a patient is fully specified in prevailing standards, such as the DOT standard. Other standards are, for example, the U.S. Department of Transportation (DOT) National Highway Traffic Safety Administration (NHTSA) National Standard Curriculum (NSC) for First Responder, Emergency Medical Technician—Basic, Emergency Medical Technician—Intermediate, and Emergency Medical Technician—Paramedic; the American Safety and Health Institute (ASHI) for Automated External Defibrillator (AED), Advanced Cardiac Life Support (ACLS), First Responder, Oxygen Administration, Wilderness Emergency Care (WEC), Safety Training and Aquatic Rescue (STAR), CPR for Community, Workplace and Professional Rescuers, and Basic First Aid; the American Heart Association for Advanced Cardiac Life Support (ACLS), Pediatric Advanced Life Support (PALS), Basic Life Support (BLS), and Cardiopulmonary Resuscitation (CPR) and Emergency Cardiovascular Care; the American Red Cross for First Aid, CPR and AED, and Water Safety; the National Ski Patrol (NSP) for Outdoor Emergency Care Skill Guides; the U.S. Federal Emergency Management Agency (FEMA) for Terrorism Awareness, and Terrorism Operations; the American College of Surgeons for Advanced Trauma Life Support, Prehospital Trauma Life Support; the National Registry of EMTs (NREMT) for EMT—Basic, and EMT—Paramedic; the American Academy of Pediatrics for Pediatric Prehospital Pediatric Care; and the National Association of EMTs for Pediatric Prehospital Emergency Care.

As mentioned above, user input may comprise querying the patient, communicating with the patient, checking vital signs of the patient, administering various forms of treatment such as drugs, immobilization, wound treatments, and the like. An extensive database of questions and actions the user can take is maintained by the simulator 210 and made available to the user 200 in the form of a toolbox. The user has access to the toolbox and can choose from a multiplicity of actions, even if it is an incorrect action, to take given the situation and feedback provided to the user by the patient 212.

The evaluator 230 (FIG. 2) evaluates each relevant line item (step 106 of FIG. 3). Evaluating comprises computing a score, or points awarded (128 of FIGS. 4A–D), for each relevant line item. For some line items, the score is computed while the simulation is executing. For other line items, the score is computed after the simulation has ended by using, at least in part, the logged events stored by the event logger 220 (FIG. 2). The type and sequence of user input in order to receive a correct line item score varies according to each line item and simulation. By way of example, the "Altered Mental Status" (132 of FIG. 4B) category comprises a multiplicity of line items. The DOT skill sheet procedures prescribe that the user should elicit information about the episode 135, onset 135, duration 135, associated symptoms 136, evidence of trauma 137, interventions 138, seizure 139, and fever 140. If the user does this in accordance with prevailing standards, the associated line items will receive a correct score. Some user actions can be applied to all cases of altered mental status, for example checking the patient's forehead skin condition to determine if they have a fever. Some correct user actions are more specific to the particular simulated patient problem, such as if the underlying problem is a stroke, the user should check for any weakness or motor deficit on one side. If the patient is an unresponsive seizure patient, a more detailed examination of the head, including an examination of the ears, mouth, etc., is required according to prevailing assessment protocols. A correct line item score for most line items is a score equal to one, although some line items may have a score of greater than one, or may have a score of "OK" or "n/a."

The evaluator 230 comprises procedures for determining if the type of user actions, and optionally the sequence of user actions are correct. In one exemplary procedure shown below, the simulation scenario is a complex trauma and medical case. The following exemplary procedure checks for a trauma case with a diabetes problem, and then checks if the user actions are in compliance with accepted protocols:

| if (diabetes problem AND a trauma case) then | -complex trauma and medical case |
|---|---|
| --1: episode, onset, duration: 33 | -ask question 33 |
| --2: associated Sx: 3,50,53,56 | -questions to ask |
| --3: evidence of trauma: examine head and pupils with | |
| | penlight |
| --4: interventions: 117 | -ask question 117 |
| --5: seizure: 102 | -ask question 102 |
| --6: fever: get temperature | -palpate body part |
| | forehead |

If all of the above user actions are performed then the relevant line items are scored with the maximum points possible. The actions are received by the evaluator 230 from the event logger 220, the simulator 210, or both. If some or all of the actions are not taken, the score may be reduced. Some routines also specify that user action must occur according to a specific sequence and within certain time periods to be considered correct. Each line item is evaluated according to a routine such as shown above and as specified in the DOT and other appropriate standards.

Some user input is logged by the event logger (220 of FIG. 2). The logged input is referenced by procedures such as shown above at a later time in the simulation, or after the simulation has ended, to evaluate each relevant line item score. For example, if the user inappropriately administers pain stimulus, the sequence and timing of the user action is not important. However, the mistake should be indicated by a line item score along with any relevant comments (130 of FIG. 4A). Such user actions are logged by the event logger 220. Errors are also logged dynamically, while the simulation is executing. For example if the user places the patient on a spine board after beginning transport of the patient, an error is logged by setting a variable. The variable is used when computing the line item score according to a procedure such as shown above. User input may also comprise time stamps so that the correctness of the user input can be computed based on the absolute time, relative time, or both. An example of absolute time is a defibrillator shock must be administered to the patient within 90 seconds of cardiac arrest. An example of relative time is an airway must be opened before inserting an airway adjunct. Some line items require multiple actions to be performed correctly and in the correct order.

A complete exemplary evaluation procedure for medical skill sheet line item 18 (120 of FIG. 4B) is shown below. Evaluation procedures for medical skill sheet line item 24 and line item 33 are also shown. As described with reference to the above procedure, the numbers refer to question number indexes stored in the question database, but may also refer to body part number indexes for performing actions on specified body parts as indicated by the comments in the procedure below. Thus, medical skill sheet line item 18 procedure is as follows:

```
if the present illness is altered mental status then
    set DOTMedicalHx.AMS.indicated to 1    -- this causes the
        correct output to be displayed (see Exhibit C)
    set DOTMedicalHx.AMS.bodyPart to "head"
```

-continued

```
if stroke problem then
    --1: episode, onset, duration: 81,96; 33; 110 -- questions
        that must be asked while Pt. is conscious
    --2: associated Sx: 3,50,53,56,83,84,85,107,108 -- questions
        that must be asked while Pt. is conscious
    --3: evidence of trauma: examine head with examine tool and
        pupils with penlight
    --4: interventions: 117        -- question that must be
        asked while Pt. is conscious
    --5: seizure: 102              -- question that must be
        asked while Pt. is conscious
    --6: fever: get temperature - palpate bodypart forehead
    -- Focused Exam Requirements ---- medical skill sheet line
        item 24: "Problem focused physical examination" -----
    set DOTMedicalHx.bodyPart to "head"
    set DOTMedicalHx.examine to "4"      -- this is a
        bodypart number
    set DOTMedicalHx.pupilCheckIndicated to true
    set DOTMedicalHx.questions to ""     -- no additional
        questions required
    set DOTMedicalHx.complexQuestions to ""   -- no additional
        questions required
    -- Ongoing Ax Requirements ---- medical skill sheet line
        item 33: "Repeats focused assessment regarding Pt
        complaints or injuries"
    set DOTMedicalHx.ongoingQuestions to "92,3,50,53"
    set DOTMedicalHx.OngoingComplexQuestions to "8"
if (diabetes problem AND a trauma case) then  -- complex trauma
        and medical case
    --1: episode, onset, duration: 33
    --2: associated Sx: 3,50,53,56
    --3: evidence of trauma: examine head and pupils with
        penlight
    --4: interventions: 117
    --5: seizure: 102
    --6: fever: get temperature - palpate bodypart forehead
if (diabetes and NOT a trauma case) then
    --1: episode, onset, duration: 81,96; 33; nothing for
        duration
    --2: associated Sx: 3,50,53,56,83,84,85  -- need more in
        depth questions, pure medical case
    --3: evidence of trauma: examine head and pupils
    --4: interventions: 25
    --5: seizure: 102
    --6: fever: get temperature
    -- Focused Exam Requirements ---- medical skill sheet line
        item 24 -----
    set DOTMedicalHx.bodyPart to "head"
    set DOTMedicalHx.examine to "4"
    set DOTMedicalHx.pupilCheckIndicated to true
    set DOTMedicalHx.questions to ""
    set DOTMedicalHx.complexQuestions to ""
    -- Ongoing Ax Requirements ---- medical skill sheet line
        item 33 -----
    set DOTMedicalHx.ongoingQuestions to "92,3,50,53"
    set DOTMedicalHx.OngoingComplexQuestions to "8"
if (unresponsive seizure patient) then
    set DOTMedicalHx.AMS.indicated to 1
    set DOTMedicalHx.bodyPart to "head"
    --1: episode, onset, duration: no questions required, Pt
        can't respond
    --2: associated Sx: no questions required, Pt can't respond
    --3: evidence of trauma: examine head and pupils with
        penlight
    --4: interventions: no questions required, Pt can't respond
    --5: seizure: no questions required, Pt can't respond
    --6: fever: get temperature - palpate bodypart forehead
    -- Focused Exam Requirements ---- medical skill sheet line
        item 24 -----
    set DOTMedicalHx.bodyPart to "head"
    set DOTMedicalHx.examine to "2,4,5,6,7,8" -- more
        careful/detailed examination of head is indicated
    set DOTMedicalHx.pupilCheckIndicated to true
    set DOTMedicalHx.questions to "" - no questions required, Pt
        can't respond
    set DOTMedicalHx.complexQuestions to "" - no questions
        required, Pt can't respond
    -- Ongoing Ax Requirements ---- medical skill sheet line
        item 33 -----
    set DOTMedicalHx.ongoingQuestions to "" -- no questions
        required, Pt can't respond
    set DOTMedicalHx.OngoingComplexQuestions to "" -- no
        questions required, Pt can't respond
```

In executing the above procedures, variables are set indicating the number of user actions performed correctly and the number of user actions missed or performed incorrectly. The value of the variables are added and a percentMissed variable is set indicating the percentage of actions missed or done incorrectly. Based on the percentMissed variable, a score for line item 18, medicalPoint[18], is computed according to the following exemplary procedure of evaluator 230:

```
set medicalPoints[18] based on percentMissed:
    = 0%      :    medicalPoints[18] = 4 points
    <= 25%    :    medicalPoints[18] = 3 points
    <= 50%    :    medicalPoints[18] = 2 points
    <= 75%    :    medicalPoints[18] = 1 points
    else      :    medicalPoints[18] = 0 points
```

As mentioned with reference to FIG. 4A, each line item has a points possible variable 126. The total number of points possible is set according to the simulation scenario and DOT or other skill sheet standards. Some line items may be determined as not relevant according to step 104 and are thus scored "n/a."

Referring back to FIG. 3, after all line items are evaluated, a skill sheet is generated (step 108) from the evaluated line items of the skill sheet templates. The skill sheet is presented in a format such as a DOT format, an AHA format, or an NREMT format. The skill sheet may be displayed to the user on a computer screen or monitor, or may be printed. The skill sheet may also be put in the form of HTML (hypertext markup language) code for displaying via Internet web browsers. Many different skill sheets may be generated such as a trauma skill sheet, a medical skill sheet, a cardiac skill sheet, a cardio-pulmonary resuscitation skill sheet, and an automated external defibrillation skill sheet. Other examples of skill sheets and skill sheet formats include EMT skill sheets and EMT Paramedic Level of Practice skill sheets from the National Registry of Emergency Medical Technicians such as patient assessment/management—trauma, patient assessment/management—medical, cardiac arrest management/AED, big-valve mask apneic patient, spinal immobilization—supine patient, spinal immobilization—seated patient, immobilization skill—long bone, immobilization skills—joint injury, immobilization skills—traction splinting, bleeding control—shock management, airway, oxygen and ventilation skills—upper airway adjuncts and suction, mouth-to-mask with supplemental oxygen, oxygen administration, ventilatory management—endotracheal intubation, ventilatory management—dual lumen airway device insertion following an unsuccessful endotracheal intubation attempt, and ventilatory management—esophageal obturator airway insertion following an unsuccessful endotracheal intubation attempt. Further examples of skill sheets and skill sheet formats from the National Registry of Emergency Medical Technicians are bleeding control/shock management, dual lumen airway device, dynamic cardiology, intravenous therapy, oral station, patient assessment—medical, patient assessment—trauma, pediatric intraosseous infusion, pediatric ventilatory management, spinal immobilization—seated patient, spinal immobilization—supine patient, static cardiology, and ventilatory management—adult.

Figure 8B:

FIGS. 7A–D shows the printed output of an HTML generated skill sheet. The output comprises multiple skill sheets from one simulation scenario. In this simulation scenario, the trauma skill sheet was not relevant as indicated by the section entitled "Trauma Assessment & Management" in FIG. 7A. The cardiac skill sheet was also not relevant to this simulation as shown in FIG. 7D under the section entitled "Cardiac Arrest Management/AED." The medical skill sheet, entitled "Medical Assessment & Management," is shown in the FIGS. 7A–D. The skill sheet comprises the values of the variables of the line items of the medical skill sheet template (FIGS. 4A–D) as discussed above. For example, some line items comprise the text message (124 of FIG. 4A), the points possible (126 of FIG. 4A), the points awarded (128 of FIG. 4A), and comments (130 of FIG. 4A). A total, indicated by the label "TOTAL" in FIG. 7C is also displayed and shows the total points and percentage failure. FIGS. 8A–C show an alternative presentation of the medical skill sheet in the form of a screen output.

The present invention may be implemented on a computer such as a desktop or laptop computer commonly found in homes and businesses. A computer-readable medium may store instruction for generating the skill sheet which, when executed by a processor, such as a computer's processor, causes the processor to perform the steps of the methods described above. Examples of computer-readable medium are floppy disks, hard disk drives, DRAM, SRAM, flash memory, optical storage, magnetic storage, magneto-optical storage, non-volatile solid-state memory, volatile solid-state memory, and the like.

Other simulators can be used with the present invention. For example, a human model for Advanced Life Support (ALS) may be used for practicing skills such as intubation, 12-lead EKG operation, intravenous fluid (IV) and drug administration, and capnography and copnometry assessment. Another simulator includes terrorism awareness and operation simulation training for training first responders to assess scene safety, identify likely hazards, perform scene containment and patient triage, and the like. Yet another simulator comprises outdoor professional emergency medical training for assessing and treating patients given limited medical resources and long transportation times to definitive medical care. Outdoor professional emergency medical personnel include individual such as ski patrol personnel, forest fire fighters, and outdoor guides. Still another simulator is a simulator for non-professional individuals responding to immediate accidents or medical crises such as sudden cardiac arrest, home first aid, and child care. This simulator may include simulation scenarios for cardiopulmonary resuscitation and the application of automated external defibrillators.

The foregoing detailed description has discussed only a few of the many forms that this invention can take. It is intended that the foregoing detailed description be understood as an illustration of selected forms that the invention can take and not as a definition of the invention. It is only the following claims, including all equivalents, that are intended to define the scope of this invention.

What is claimed is:

1. A method for generating a skill sheet for a user participating in a medical emergency response simulation program, the simulation program comprising a model for simulating the response of a simulated subject to the input of the user, the method comprising:
   (a) providing a simulation scenario;
   (b) choosing a skill sheet template, wherein the skill sheet template comprises a plurality of line items;
   (c) determining which line items of the plurality of line items are relevant;
   (d) evaluating each relevant line item; and
   (e) generating a skill sheet according to said evaluating in (d).

2. The invention of claim 1 wherein said determining in (c) comprises determining according to the simulation scenario.

3. The invention of claim 1 wherein said determining in (c) comprises determining according to the user input.

4. The invention of claim 1 wherein said evaluating in (d) comprises computing a score for each relevant line item of the plurality of relevant line items.

5. The invention of claim 4 further comprising for each relevant line item, computing a number of possible points.

6. The invention of claim 4 further comprising for each relevant line item, computing the score by determining the sequence and type of the user input.

7. The invention of claim 6 further comprising computing the score by comparing the determined sequence and type of user input to a known correct sequence and type of user input.

8. The invention of claim 4 further comprising logging the user input and computing the score according to the logged user input.

9. The invention of claim 1 wherein said evaluating in (d) comprises evaluating while the simulation scenario is executing.

10. The invention of claim 1 wherein said evaluating in (d) comprises evaluating after the simulation scenario has ended.

11. The invention of claim 1 wherein said evaluating in (d) comprises assigning a comment to at least some of the plurality of relevant line items.

12. The invention of claim 1 wherein each relevant line item comprises a condition variable, a text message variable, a points possible variable, a points awarded variable, and a comments variable.

13. The invention of claim 1 wherein said generating in (e) comprises presenting the skill sheet to the user in a Department of Transportation format.

14. The invention of claim 1 wherein said generating in (e) comprises presenting the skill sheet to the user in a National Registry of Emergency Medical Technicians format.

15. The invention of claim 1 wherein said generating in (e) comprises presenting the skill sheet to the user in an American Heart Association format.

16. The invention of claim 1 wherein said generating in (e) comprises generating at least one of the following skill sheets: a trauma skill sheet, a medical skill sheet, a cardiac skill sheet, a cardio-pulmonary resuscitation skill sheet, an automated external defibrillation skill sheet.

17. The invention of claim 1 wherein said generating in (e) comprises generating a skill sheet selected from the group of skill sheets consisting of Department of Transportation skill sheets, National Registry of Emergency Medical Technicians skill sheets, and American Heart Association skill sheets.

18. The invention of claim 1 wherein said generating in (e) comprises generating hypertext markup language code.

19. The invention of claim 1 wherein said generating in (e) comprises displaying a name of the skill sheet, a line item description, a points possible, and a points awarded.

20. The invention of claim 19 wherein said generating in (e) further comprises displaying a comment.

21. A computer-readable medium having stored thereon instructions for generating a skill sheet which, when executed by a processor, causes the processor to perform the steps of:
 (a) providing a simulation scenario;
 (b) choosing a skill sheet template, wherein the skill sheet template comprises a plurality of line items;
 (c) determining which line items of the plurality of line items are relevant;
 (d) evaluating each relevant line item; and
 (e) generating a skill sheet according to said evaluating in (d).

22. A computer program product for generating a skill sheet, the program product comprising:
 a computer readable medium;
 simulation scenario means stored on said computer readable medium for simulating the response of a simulated human subject to a user input;
 choosing means stored on said computer readable medium for choosing a skill sheet template;
 determining means stored on said computer readable medium for determining a relevance of a plurality of line items of the skill sheet template;
 evaluating means stored on said computer readable medium for evaluating the plurality of relevant line item; and
 generating means stored on said computer readable medium for generating a skill sheet.

23. A system for generating a skill sheet for a user, the system comprising:
 a simulator;
 an event logger in communication with the simulator;
 an evaluator in communication with said simulator and said event logger;
 at least one skill sheet template in communication with said evaluator; and
 a skill sheet generator in communication with said evaluator;
 wherein said simulator receives user input from the user; and
 wherein said event logger receives user input from the user.

24. The invention of claim 23 wherein said at least one skill sheet template comprises a plurality of line items.

25. The invention of claim 24 wherein said plurality of line items are consistent with skill sheet standards selected from the group of skill sheets standards consisting of Department of Transportation skill sheets, National Registry of Emergency Medical Technicians skill sheets, and American Heart Association skill sheets.

26. The invention of claim 24 wherein each of said plurality of line items comprises a condition variable, a text message variable, a points possible variable, a points awarded variable, and a comments variable.

27. The invention of claim 23 wherein said at least one skill sheet template is a medical skill sheet.

28. The invention of claim 23 wherein said at least one skill sheet template is a trauma skill sheet.

29. The invention of claim 23 wherein said at least one skill sheet template is a cardiac skill sheet.

30. The invention of claim 23 wherein said simulator comprises a human model.

31. The invention of claim 23 wherein said simulator comprises a plurality of simulation scenarios.

* * * * *